United States Patent [19]

Behnk et al.

[11] Patent Number: 4,485,525
[45] Date of Patent: Dec. 4, 1984

[54] DEVICE FOR ALIGNING FISH WITH REGARD TO THE POSITION OF THEIR PLANE OF SYMMETRY

[75] Inventors: Günter Behnk, Reinfeld; Herbert Köhn, Bad Schwartau; Günther Pinkerneil, Lübeck, all of Fed. Rep. of Germany

[73] Assignee: Nordischer Maschinenbau Rud. Baader GmbH & CO KG, Lübeck, Fed. Rep. of Germany

[21] Appl. No.: 407,335

[22] Filed: Aug. 12, 1982

[30] Foreign Application Priority Data

Aug. 20, 1981 [DE] Fed. Rep. of Germany ....... 3132864

[51] Int. Cl.³ .............................................. A22C 25/08
[52] U.S. Cl. ........................................... 17/55; 17/56; 17/61
[58] Field of Search .................... 17/61, 56, 53, 57, 55, 17/52

[56] References Cited

U.S. PATENT DOCUMENTS

| 1,819,060 | 8/1931  | Baader ..................................... 17/56 |
| 2,893,052 | 7/1959  | Schlichting .......................... 17/56 X |
| 2,961,696 | 11/1960 | Michael ............................... 17/55 X |
| 3,521,322 | 7/1970  | Michael et al. ......................... 17/55 |
| 4,270,650 | 6/1981  | Krohn ................................. 17/55 X |

FOREIGN PATENT DOCUMENTS

| 105226  | 9/1966 | Denmark ................................ 17/56 |
| 2833097 | 3/1979 | Fed. Rep. of Germany .......... 17/56 |

Primary Examiner—Willie G. Abercrombie
Attorney, Agent, or Firm—Edward F. Levy

[57] ABSTRACT

A device for aligning fish to be handled in fish-processing machines is shown. The object of the invention is to lead fish, especially those with approximately circular cross-section to the processing tools so exactly that the processing can be carried out most economically, i.e. with a high yield without any danger of undesirable parts, e.g. the skeleton, remaining in the product to be used. The device according to the invention handles fish whose abdominal cavity is opened. The device comprises, in a known manner, a saddlelike guide element which supports the fish in its abdominal cavity, conveying means which engage the flanks of the fish being arranged on both sides of the guide element. A support surface which is formed with a concave cross-section carries knives extending into the fish path and lying flush with the support edges. These knives serve to provide slots at the end of the abdominal cavity to reach into the tail part so that an aligned guiding in particular of this part of the fish becomes possible.

3 Claims, 3 Drawing Figures

DEVICE FOR ALIGNING FISH WITH REGARD TO THE POSITION OF THEIR PLANE OF SYMMETRY

BACKGROUND OF THE INVENTION

1. Field of the Invention

The invention concerns a device for aligning fish conveyed head first regarding their plane of symmetry and for preparing the tail part of the fish for the aligned guiding during the handling of the fish in fish-processing machines, in particular fish whose cross-section approximates circular shape, the abdominal cavity of the fish having been opened by a strip cut extending at least behind the vent fin almost perpendicular to the plane of symmetry of the fish and equidistant to the seam of its belly, the device comprising conveying means for transporting the fish along processing tools of the processing machine, as well as a saddle-shaped guiding element which supports the fish in its abdominal cavity and defines a pair of support edges extending upwards symmetrically to the longitudinal axis or centre.

2. Description of Prior Art

In view of the ever-decreasing number of fish the need to supply human consumption with the highest possible yield grows. The consciousness about quality in the consumer of today means that such products made optimal in respect of yield must at least correspond to the usual quality standards. The prerequisite for reaching this goal in connection with fish-processing is that, especially with automatic bulk processing, processes and devices must be used which make a very precise handling possible. If a processing by cutting occurs, e.g. to produce fillets, then each fish must be guided and conveyed exactly aligned during the processing in order to make an economical cutting possible. This, however, is a special problem with fish having an almost circular cross-section since engaging fish by the outer contour, which engagement has an influence on the position of the plane of symmetry of the fish can only give an unsatisfactory result. This concerns especially the tail part which begins behind the end of the abdominal cavity and tends to twist because of the guiding and processing forces affecting the fish.

In practice there is known a device which is used especially as a supply aggregate in machines for the treatment of herring-type fish. The structure of that device comprises the features stated in the above introductory paragraph of this specification. It is possible with the help of this device to align fish whose cross-section clearly deviates from circular shape regarding their plane of symmetry sufficiently exactly, but it malfunctions on mackerel-like fish, for example, whose cross-section strongly approximates circular shape.

3. Object of the Invention

It is therefore the primary object of the present invention to universalise this known device in a manner that fish with almost circular cross-section can be so aligned and prepared that their further handling in exact alignment is possible.

BRIEF SUMMARY OF THE INVENTION

To this end a device is proposed for aligning fish conveyed head first with regard to the position of their plane of symmetry and for preparing the tail part of the fish for the aligned guiding during their handling in fish-processing machines, in particular fish whose cross-section approximates circular shape, the abdominal cavity of the fish having been opened by a strip cut extending at least behind the vent fin almost perpendicular to the plane of symmetry of the fish and equidistant to the seam of its abdomen, the device comprising conveying means for transporting the fish along processing tools of the processing machine as well as a saddle-shaped guiding element which supports the fish in its abdominal cavity, and defines a pair of support edges extending upwards symmetrically to the longitudinal centre, support edges of the driving element being designed as knives along at least one part of their length, the cutting edges of the knive ascending in the conveying direction to extend into the fish path, and wherein spring-biassed hold down means are provided in the region opposite the knives.

The advantages thus achieved particularly exist in that the processing cuts can be carried out extremely exactly and without the danger of undesirable parts, e.g. the skeleton remaining in the product to be used for nutrition. This is possible since now it is guaranteed that each fish, during its treatment, can be guided exactly aligned in the region of its abdominal cavity in that the knives support the fish on the underside of its rib appendages resp. the lateral vertebral projections on both sides of the vertebral column, and in the region of the tail part in that the knives seeking the way along both sides of the backbone cut into the muscle flesh so that the tail part of the fish can also be guided exactly by an engagement of these cuts. Since hold down means yielding against the force of a spring are arranged in the region opposite the knives the fish can be pressed against the knives with extra force so that their penetrating into the muscle flesh is made certain.

Endlessly rotating first entraining conveyors which engage the fish by their flanks and having a saw-tooth-shaped profile extending essentially perpendicular to the conveying direction of the conveyor may advantageously be arranged as conveying means in the region of the knives. The fish hereby have sufficient freedom when conveyingly engaged to fit into the fish path especially in the region of the knives for the displacement of their plane of symmetry.

The hold down means may preferably be designed as a second entraining conveyor engaging the fish at its back, provided with prismatically recessed catches, being driven to rotate endlessly at the speed of the first conveyors and, at least in the region of the knives, being held down by a pressing roller.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings.

DETAILED DESCRIPTION OF THE PREFERRED EMBODIMENTS

Figure 1:
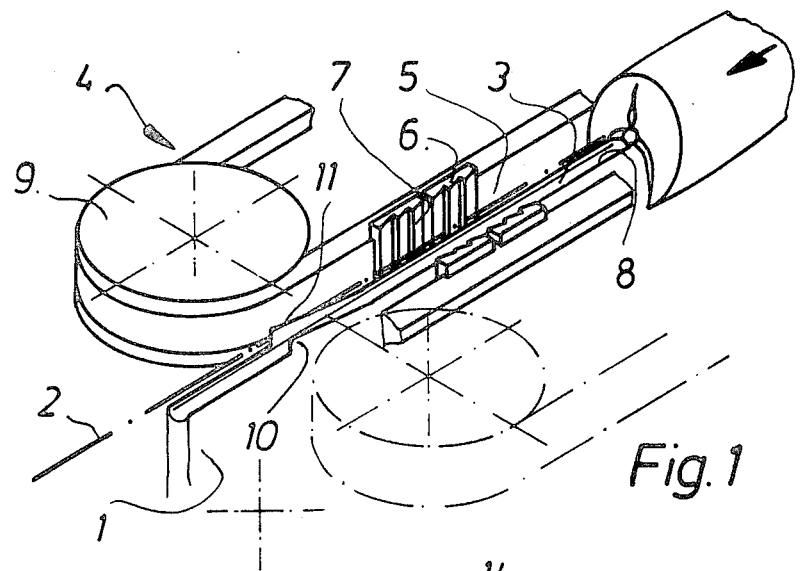
FIG. 1 shows a partial axonometrical view of the device, the entraining conveyor engaging the fish at its back having been omitted for the sake of clarity.
Figure 2:
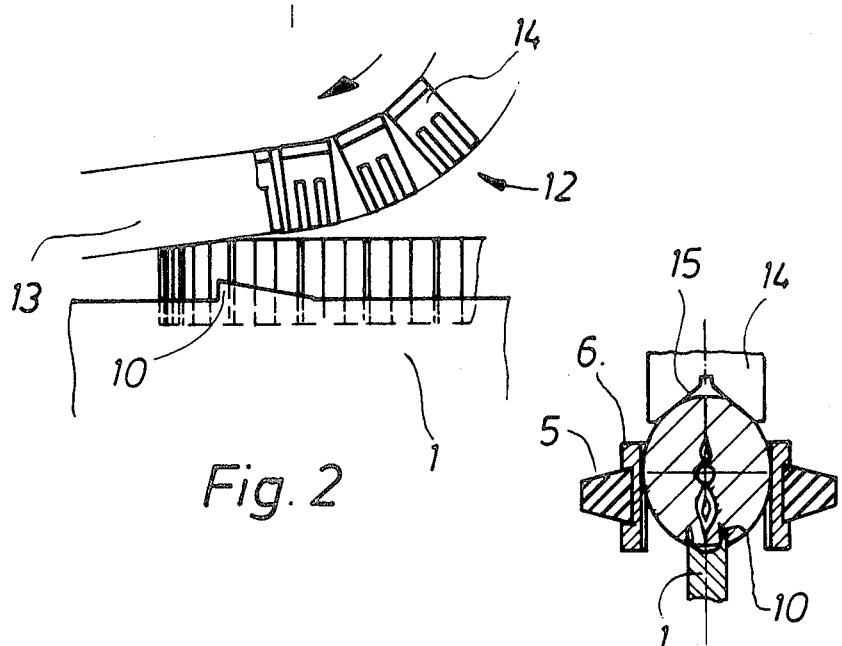
FIG. 2 shows a partial side elevation omitting the driving conveyor which lies in front of the plane of the picture and engages the fish at its flanks.
Figure 3:
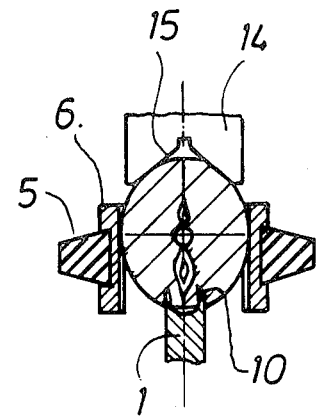
FIG. 3 shows a cross-section in the region of the knives during their function in the region behind the abdominal cavity end of the fish.

A guide element 1 is arranged in the vertical plane of symmetry of a not-shown frame of a fish-processing machine and forms a fish path 2 with its concavely-shaped support surface 3. A pair of horizontally guided and rotatingly driven first entraining conveyors 4 are provided in the plane of the support surface 3. These entraining conveyors 4 comprise e.g. V-belts 5 which are provided with entraining elements 6 whose sides facing the fish are provided with a saw-tooth profile 7 which is orientated perpendicular to the conveying direction of the fish. Support edges 8 which are raised due to the concavity of the support surface 3 graduate into knives 10 in the region of deflections 9 of the first entraining conveyors 4. Cutting edges 11 of the knives 10 ascend in the conveying direction of the fish to rise into the fish path 2. The longitudinal extension of the cutting edges 11 is about three times the distance between them. As shown in FIG. 2 a second entraining conveyor 12 rotating in the symmetrical plane of the machine is located above the guide element 1, the slack or working run 13 of the conveyor 12 being guided to lower against the support surface 3 of the guide element 1. The second entraining conveyor 12 comprises a flexible carrying web or belt which has entraining elements or catches 14 on it, the latter having a prismatic recess on their side facing the fish. Not-shown pressing means hold the slack 13 of the second entraining conveyor 12 against the support surface 3 in a resiliently yielding manner.

The function of the device is as follows:

A fish whose belly cavity has been opened by means of a strip cut which reaches to at least behind the vent fin and is carried out perpendicular to the fishes' plane of symmetry and equidistant to the seam of its belly is introduced in the appropriate way belly down between the first entraining conveyors 4 being mounted in a saddle-like manner on the guide element 1. Thereby the fish slides in the region of its belly cavity while the entrails are being displaced with the lower edge of its rib appendages resp. its lateral vertebral projections on the support edges 8 raised due to the concavity of the support surface 3 of the guide element 1. At the end of its abdominal cavity the fish is, however, supported at its abdominal contour created by the strip cut, whereby the tail part is pressed upwards so that the rear region of the tail part has no support from the support surface 3. Under the hold-down pressure of the second entraining conveyor 12 acting as a hold-down element the fish, supported laterally by the pair of first entraining conveyors 4 reaches the knives 10 which raise it in the region of the abdominal cavity over the rib appendages resp. the lateral vertebral projections and guides it in an aligned manner. At the end of the abdominal cavity the down-hold pressure, however, effects that the knives 10 on both sides of the backbone cut into the muscle flesh, an orientation of the backbone between the knives 10 and thus an alignment of the tail part being achieved. Since the strip cut which opens the abdominal cavity is discontinued before the end of the tail this part of the tail region is still covered by the skin. Due to the toughness of the skin no more incisions occur in this region, but only an impression of the knives 10 so that the last part of the tail region is pressed upwards in a centred manner into the prismatic recess 15 of the catches 14. After the knives 10, the fish is taken over by a guide engaging the incisions and accordingly led firmly in the aligned position through the following but not-shown processing tools.

What is claimed is:

1. A device for aligning fish, said fish defining a cross-section approximating circular shape and a plane of symmetry, and having a head and a tail part as well as flanks, a back and an abdomen forming an abdominal cavity, all intermediate said head and said tail part, said flanks ending in a belly seam extending along the outside of said abdomen and including a vent fin in the region of the end of said abdominal cavity facing said tail part, said abdominal cavity having been opened by a strip cut extending at least behind said vent fin almost perpendicular to said plane of symmetry and equidistant to said belly seam, said device conveying said fish with said head leading in a conveying direction along a fish path, aligning said fish with regard to the position of said plane of symmetry, preparing said tail part for an aligned guiding of said fish during their handling in a fish-processing machine, including processing tools, and comprising
   (a) conveying means for transporting said fish along said processing tools of said processing machine,
   (b) a saddle-shaped guiding element which supports said fish in said abdominal cavity and defines a pair of support edges extending upwards symmetrically with respect to said plane of symmetry, and being designed as knife means along at least part of the length of said support edges, said knife means defining cutting edge means ascending in said conveying direction to extend into said fish path and being positioned to cut parallel incisions in the belly side of the tail part of the fish as said fish is transported by said conveying means along said knife means, and
   (c) spring-biassed hold down means situated in the region opposite said knives.

2. A device as claimed in claim 1, wherein said conveying means are formed by endlessly rotating first entraining conveyor means in the region of said knife means and engage said fish by said flanks, said first entraining conveyor means having a saw-tooth-shaped profile extending essentially perpendicular to said conveying direction.

3. A device as claimed in claim 1 or 2 wherein said hold down means comprise
   (a) second entraining conveyor means engaging said fish at said back, provided with prismatically recessing entraining elements and driven to rotate endlessly at the speed of said conveying means and
   (b) pressing roller means to hold down said second entraining conveyor means at least in the region of said knife means.

* * * * *